United States Patent [19]
Nishikawa et al.

[11] Patent Number: 5,101,239
[45] Date of Patent: Mar. 31, 1992

[54] TRANSFER DEVICE FOR ELECTROPHOTOGRAPHIC PRINTER

[75] Inventors: Tomoyuki Nishikawa, Chiba; Masahiro Kita, Tokyo; Takaaki Yano, Saitama; Tatsuya Yoshida, Saitama; Ryoji Honda, Saitama; Kiyoshi Negishi, Saitama; Tsutomi Sato, Tokyo; Shoji Kamasako, Saitama, all of Japan

[73] Assignee: Asahi Kogaku Kogyo Kabushiki Kaisha, Tokyo, Japan

[21] Appl. No.: 612,083

[22] Filed: Nov. 13, 1990

[30] Foreign Application Priority Data

Nov. 10, 1989 [JP] Japan .................................. 1-293712
Apr. 11, 1990 [JP] Japan .................................. 2-98226

[51] Int. Cl.$^5$ ............................................. G03G 15/16
[52] U.S. Cl. ..................................... 355/274; 361/229
[58] Field of Search ............ 355/274, 271, 309, 225; 361/229

[56] References Cited

U.S. PATENT DOCUMENTS

| | | | |
|---|---|---|---|
| 3,620,617 | 11/1971 | Kelley et al. | 355/274 |
| 3,909,258 | 9/1975 | Kotz . | |
| 4,367,032 | 1/1983 | Sakamoto et al. . | |
| 4,389,112 | 6/1983 | Ogata et al. | 355/274 |
| 4,423,951 | 1/1984 | Rightmyre . | |
| 4,640,880 | 2/1987 | Kawanishi et al. . | |
| 4,736,227 | 4/1988 | Till et al. . | |
| 4,882,606 | 11/1989 | Deguchi | 355/274 |
| 4,908,668 | 3/1990 | Takamatsu et al. | 355/274 |
| 4,922,303 | 5/1990 | Takeda et al. | 355/274 |

FOREIGN PATENT DOCUMENTS

| | | | |
|---|---|---|---|
| 58-82281 | 5/1983 | Japan | 355/274 |
| 1266997 | 3/1972 | United Kingdom . | |

Primary Examiner—Joan H. Pendegrass
Attorney, Agent, or Firm—Sandler, Greenblum, & Bernstein

[57] ABSTRACT

In an electrophotographic printer, a toner image formed on a photoconductive member is transferred onto a recording medium by charging the recording medium and by making the charged recording medium contact the toner image formed on the photoconductive member. A transfer charger for charging the recording medium is arranged in such a fashion that the transfer charger faces the recording medium at the upstream-side portion, with respect to the feeding direction of the recording medium, of an area where the photoconductive member and the recording medium contact. Therefore, the recording medium is charged at the upstream side of the portion with respect to the lateral center of the portion where the recording medium and the image carrying means contact.

5 Claims, 10 Drawing Sheets

TRANSFER DEVICE FOR ELECTROPHOTOGRAPHIC PRINTER

BACKGROUND OF THE INVENTION

The present invention relates to a transfer device provided in a printer employing an electrophotographic image transferring system.

An electrophotographic printer or the like is designed to perform the steps of forming a latent image by scanning the circumferential surface of a photoconductive drum with a laser beam carrying image data, adhering toner to the drum by means of a developing unit, transferring a toner image to recording paper by means of a transfer unit, and fixing the toner image thus transferred by thermocompression adhesion.

When humidity is high in the case of the conventional transfer charger, the transfer charger voltage should be set relatively low in order to obtain a appropriate printed (or, transferred) image. On the other hand, when humidity is low, the transfer charger voltage should be set relatively high in order to obtain an appropriate printed image. When the transfer charger voltage is set so that the image density becomes high either where the humidity is high or low, a faulty transfer arises in other environmental conditions.

When the voltage is preset so that a recording sheet is sufficiently charged in the case of high humidity, for instance, the charge amount will become insufficient when the actual humidity is low, whereas when the voltage is preset so that the sheet is sufficiently charged in the case of low humidity, the efficiency of transferring images to the paper will decrease when used in high humidity because the transfer voltage is unnecessarily high. In addition, imperfect cleaning will be unavoidable.

SUMMARY OF THE INVENTION

It is therefore an object of the invention to provide an improved transfer unit capable of providing constant transfer efficiency, irrespective of humidity variation.

In order to accomplish the aforementioned object, according to the invention, there is provided a transfer device employed in an electrophotographic printer for transferring a toner image onto a recording medium.

The device includes a mechanism for carrying the toner image to be transferred onto the recording medium and a transfer charger for charging the recording medium so that the toner image carried by said image carrying means is transferred to said recording medium. The lateral center of a discharging area of the transfer charger is arranged to face the recording medium at the upstream-side portion, with respect to the feeding direction of the recording medium, of an area where the image carrying mechanism and the recording medium contacts. Thus the recording medium is charged at the upstream side of the portion with respect to the lateral center of the portion where the recording medium and the image carrying mechanism contacts.

According to another aspect of the invention, there is provided an electrophotographic printer which includes:

a recording medium and;

a photoconductive member for being charged and then exposed to light carrying image data and having a latent image formed thereon, with toner being adhered onto the photoconductive member.

Further, a transfer charger for charging the recording medium so that the toner image carried by the photoconductive member is transferred to the recording medium, the lateral center of a discharging area of the transfer charger being arranged to face the recording medium at the upstream-side portion, with respect to the feeding direction of the recording medium, of an area where the photoconductive member and the recording medium contacts. Thus, the recording medium is charged at the upstream side of the portion with respect to the lateral center of the portion where the recording medium and the photoconductive member contacts.

DESCRIPTION OF THE EMBODIMENTS

Figure 1:
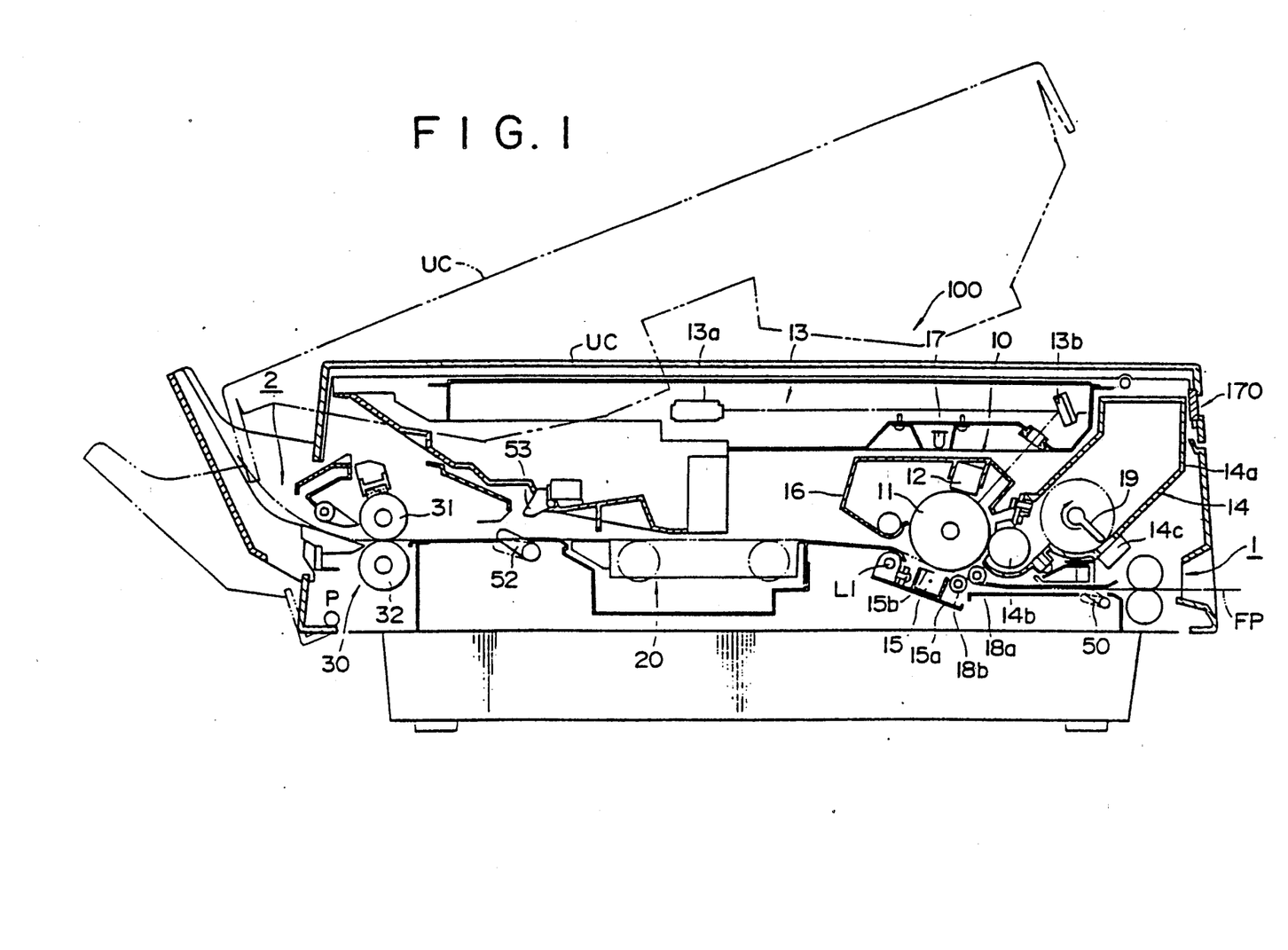
FIG. 1 is a schematic sectional view of a printer provided with a transfer unit embodying the present invention.

The printer 100 shown in FIG. 1 is a laser beam printer employing an electrophotographic image transfer system. The printer 100 comprises, in sequence, a transfer unit 10 including a photoconductive drum 11, a tractor unit 20 having an endless belt 21 for feeding a recording sheet, and a fixing unit 30 having a pair of rollers 31, 32 for heating and pressing an unfixed toner image in order to fix it on the recording sheet. Light carrying printing data from a host computer or the like is emitted from a laser scanning unit (LSU) 13, the charged circumferential surface of a photoconductive drum 11 is exposed to the light, and a latent image is formed on the circumferential surface of the photoconductive drum 11. Toner is adhered to the circumferential surface of the photoconductive drum 11 to develop a toner image via a developing unit 14. Then the toner image is transferred onto the recording sheet at a transfer charge 15, and the image thus transferred is fixed by a fixing unit 30. The printer 100 employs the electrophotograhic image transfer system, and so it is designed to be a page printer which starts printing after the printing data for one page is accumulated. The laser scanning unit 13 is secured to an upper cover UC. The upper cover UC is rotatably disposed on the main body of the printer 100 so that it can be rocked around a pivot axis P.

The printer 100 uses a continuous form recording sheet FP, which is known as fan-fold sheet. The fan-fold is a foldable continuous sheet having feed holes at both side ends, and perforated tear lines along which the recording sheet FP is easily cut off. Projections are provided on the endless belt 21 which are to be fitted to the feed holes of the continuous form recording sheet FP. The continuous form recording sheet FP is fed from a feed port 1 to a discharge port 2. It should be noted that the printer 100 is designed to print pages between the perforations in order to prevent printed data from tearing apart when the recording sheet FP is torn off at the perforated tear lines.

In case of a printer using a cut-sheet, the distance between transferring position and fixing position is not so important because printing data for one page is printed onto one sheet of recording paper. On the other hand, in a printer using a continuous sheet, if the whole portion of the sheet carrying unfixed toner image passes through the fixing position and is fixed, the paper may be wasted to the extent of the distance between transfer and fixing positions. Consequently, it is necessary to determine the portion of the sheet carrying a toner image to be fixed. In other words, it is necessary to determine the portion of the sheet carrying an unfixed toner image to remain in the printer between the transfer and fixing positions.

When the printing quality is taken into consideration, the interruption and resumption of transfer and fixing should preferably be made at the perforations where data is not printed. For this reason, the distance between the transfer position and fixing position is preferably arranged equal to the length of one page so that the perforations are located at the transfer and fixing positions when printing is stopped.

As arranged above, the portion carrying an unfixed toner image for one page remains between the transferring and fixing positions in a standby state when the printing is terminated. When another page is printed, the unfixed toner image is fixed and the remaining page is discharged. In this way, waste of paper due to the fixing of every transferred image can be avoided.

The distance between the transferring and fixing positions of the printer 100 is set to be eleven inches long for the continuous recording sheet having a page length that is eleven inches long.

The transfer unit 10 comprises a charger 12 for charging a photoreceptor material on the circumferential surface of the photoconductive drum 11 with electricity, a laser scanning unit 13 for exposing the photoconductive drum 11 to light, a developing unit 14 for adhering toner to the latent image formed on the photoconductive drum 11, a transfer charger 15 for charging the recording sheet FP with electricity to cause to toner image to be transferred to the recording sheet FP, a cleaning unit 16 for removing the residual toner on the drum, and a discharging LED 17 for totally exposing the photoconductive drum 11 to light so as to remove the charge therefrom.

The photoconductive drum 11 should be exchanged after being used for printing a certain number of pages, since it will deteriorate in its properties and fail to ensure clear printing. For example, a limit of use is set at approximately 20,000 pages. The number of printed pages are electrically counted and recorded in a counter by a control system which is described later. This counter is reset when an upper cover UC is shut after a new photoconductive drum 11 is installed.

An outwardly protruding projection (not shown) is provided on a new photoconductive drum 11. As the projection presses down a reset switch, not shown, on the body side, the control system can detect that the new photoconductive drum 11 is placed in position. The projection retracts when the operation is started and an indication of the new drum disappears. The control system resets the counter when the upper cover UC is shut after the reset switch is turned on.

The laser scanning unit 13, which is secured in the upper cover UC, continuously deflects ON/OFF-modulated beams from a semiconductor laser (not shown) by means of a polygon mirror 13a. The laser beams are converged by means of an $f\theta$ lens (not shown), reflected by a beam bender 13b, so that scanning lines are formed on the photoconductive drum 11, and an electrostatic latent image, on a dot basis, is formed as the drum rotates.

The developing unit 14 comprises a toner case 14a in which toner is contained, a developing roller 14b for adhering the toner onto the circumferential surface of the photoconductive drum 11, provided at the lower end of the case 14a, and a piezoelectric sensor acting as a low toner sensor 14c for detecting the presence or absence of the toner in the case 14a.

In normal text printing, the printing of letters are started from the left-hand side of paper so that the frequency of use of toner normally tends to become high in a portion corresponding to the left-hand side of the paper. For this reason, the toner low sensor 14c is provided in the portion corresponding to the left-hand side of the paper where the toner consumption is large.

Heretofore, two dry development methods have been generally known. One of them is a so-called monocomponent development method, and the other is a two-component development method.

In the two-component development method, carrier is mixed with toner, and stirred at relatively high speed by a scraper or the like in order to charge the toner.

On the other hand, in the monocomponent development method, toner is fed to a developing roller or the like without using carrier for charging the toner. This monocomponent development method is disclosed in the U.S. Pat. No. 3,909,258. However, there is a problem in this monocomponent development method, as the toner tends to form a block in a toner box. In order to overcome the above problem, an improved monocomponent development method, in which a relatively small amount of carrier is mixed with the toner, is disclosed in U.S. Pat. No. 4,640,880. With mixture of a small amount of carrier with the toner, lubrication between the toner grains is improved, which prevents the toner from forming blocks. It should be noted that the mixture of the carrier does not affect chargeability of the toner. In this improved monocomponent development method, the main function of the scraper is to feed the toner to the developing roller or the like. Accordingly, the scraper rotates relatively slowly in the toner box. In the printer of the present embodiment, the above-said improved monocomponent development method is employed.

Figure 3:
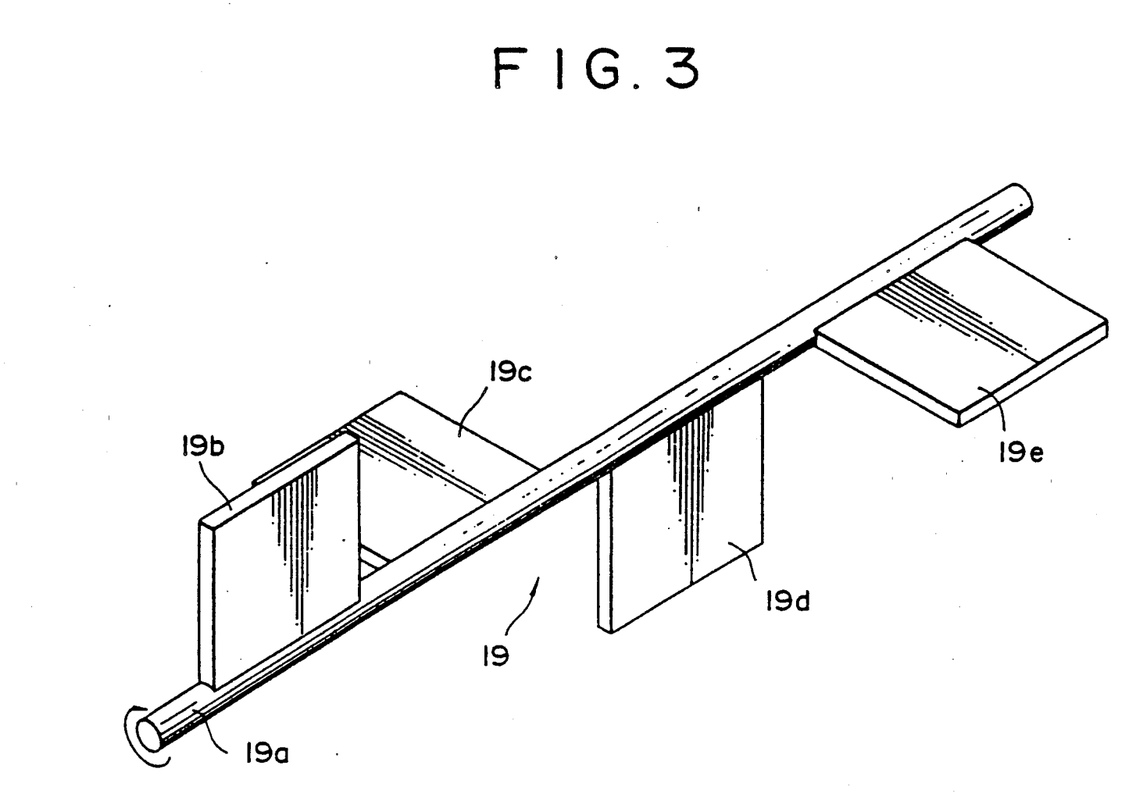
FIG. 3 is a perspective view of a scraper.

A scraper 19 is provided in the toner case 14a. The scraper 19 slowly rotates to supply the toner within the case to the developing roller 14b. The scraper 19 is, as shown in FIG. 3, composed of a rotary shaft 19a driven by a main motor, and four blades 19b, 19c, 19d, 19e fitted such that the angle between the surfaces of the blades 19b and 19c is 90 degrees, that of the blades 19b and 19d is 180 degrees, and that of the blades 19b and a9e is 270 degrees. In this specification, this angle will be called a mounting angle, i.e., the mounting angles, with respect to the blade 19b, of the blades 19c, 19d, and 19e are 90 degrees, 180 degrees, and 270 degrees, respectively. The blades 19b through 19e are driven to rotate in the direction of an arrow shown in FIG. 3.

Since the four blades are arranged to have different mounting angles, it becomes possible that the load applied on the motor when the toner is forced out is about one-quarter that of the conventional scraper having all the blades set to have the same mounting angle. Consequently, the load applied to the motor decreases and fluctuates less with the scraper of this embodiment, thus suppressing noise generation.

By sequentially making the mounting angles of the blades of the scraper 19 different, as stated above, a certain amount of toner can be gradually moved to a portion corresponding to the right-hand side of the paper as the scraper 19 slowly rotates.

When toner consumption in the portion corresponding to the right-hand side of the paper increases, as it is used for an graphic output, for instance, a low toner condition is left undetected by the low toner sensor 14c. In such a case, as since the conventional scrapers do not function to move the toner in the manner stated above, carrier may be transferred onto the circumferential surface of the photoconductive drum 11.

According to the scraper in this embodiment, the occurrence of the carrier being transferred onto the photoconductive drum 11 is made avoidable even when the toner consumption is large on the side where the toner low sensor 14c is not provided.

Figure 2:
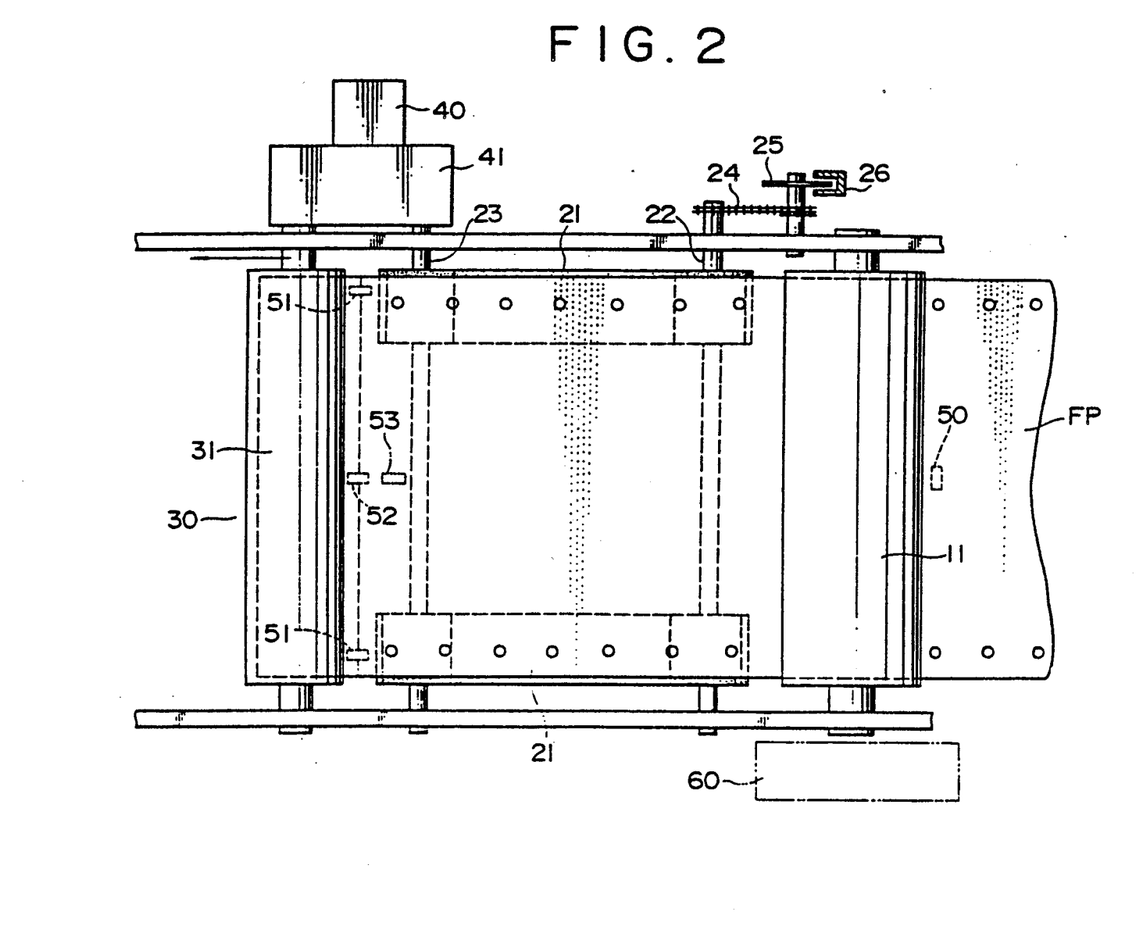
FIG. 2 is a top view of the sheet feed portion of a printer of FIG. 1.

The toner adhering to the photoconductive drum 11 is not totally removed therefrom after the termination of the transferring process. As the residual toner is unnecessary for next printing, it is removed by a cleaning unit 16. The waste toner thus removed is stored in a waste toner box 60 detachably fitted to the side of the photoconductive drum 11 as shown in FIG. 2.

When a certain amount of waste toner is accumulated in the waste toner box 60, it overflows into the printer, unless it is discarded. The waste toner may soil the inside of the printer if printing is started without the waste toner box 60.

In conventional printers, sensors have been used to detect the presence or absence of such a waster toner box 60 and the full condition of the waster toner box 60. The problem is that the plurality of sensors thus required tends to render the control system complicated.

In the printer according to the present embodiment, only one sensor is used to detect both conditions.

Figure 4:
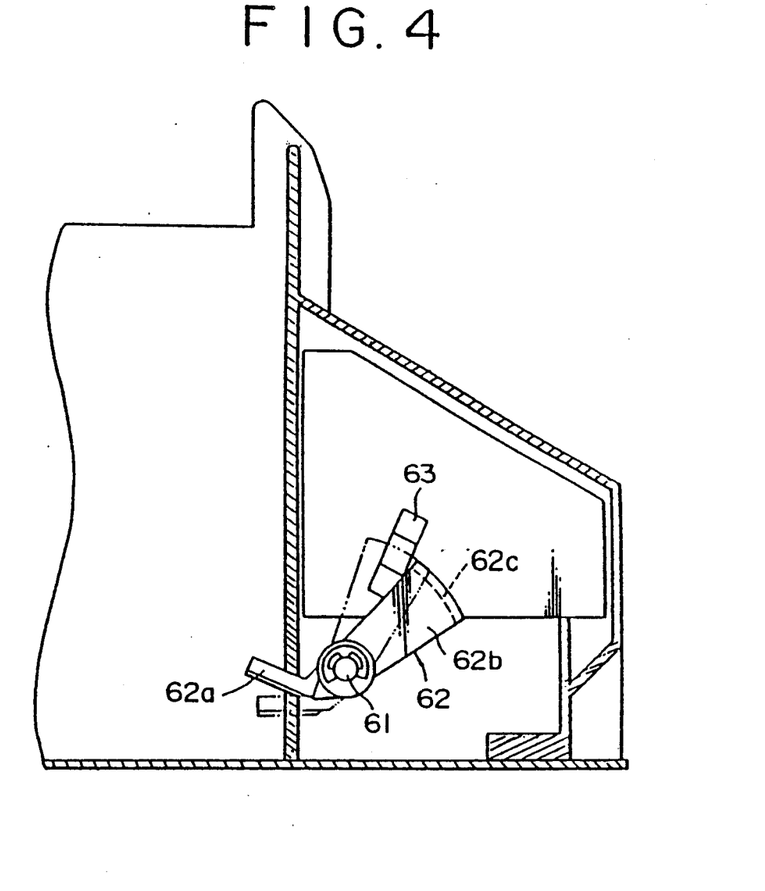
FIGS. 4 and 5 are side views of the waste toner sensor.

FIG. 4 illustrates the detecting mechanism. The waste toner box 60 is movably inserted and guided by the body, the waste toner box 60 being vertically movable. An actuator 62 is rotatably pivoted with a fulcrum 61 on the body such that a contact portion 62a is located at a position where the bottom side of the waste toner box 60 is located. A fan-shaped portion 62b is provided at the other end of the rod 62, and a light-shading or blocking wall 62c is formed on the arcuate peripheral edge of the fan-shaped portion. The light-shading wall 62c is capable of crossing the space between a light receiving element and a light emitting element of a photo-interrupter 63.

If the waste toner box is not attached, the rod 62 is caused to pivot clockwise by due to its own weight, as shown by a continuous line of FIG. 4 so that its contact portion 62a ascends and the light-shading wall 62c is located under the photo-interrupter 63. In this state, the photo-interrupter 63 produces a signal indicating that no rays of light are blocked and the control system decides that an error relating to the waste toner box 60 has occurred.

When the waste toner box 60 is attached, the contact portion 62a is forced down by the weight of the box and the rod is pivoted or rotated counter-clockwise up to a substantially horizontal state, as shown by a broken line of in FIG. 4. The light-shading or blocking wall 62c is set in a position where it screens of blocks the photo-interrupter 63. In this state, the photo-interrupter produces a signal indicating that the rays of light are blocked and the control system determines that no error relating to the waste toner box 60 has occurred.

Figure 5:
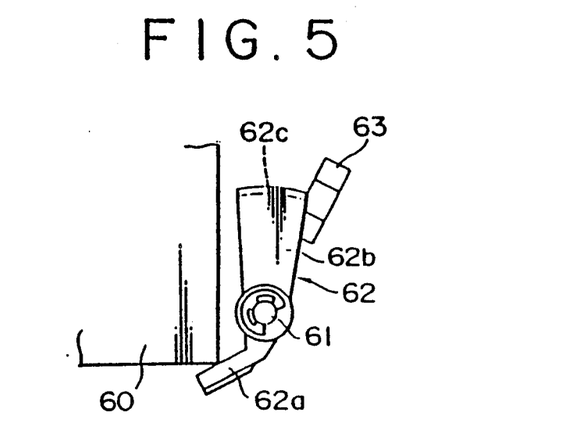

When the waste toner box 60 is filled with the waste toner, the contact portion of the rod is caused to descend due to the weight of accumulated toner, as shown in FIG. 5, and the light-shading wall 62c moves up to the left-hand side of the photo-interrupter 63. In this state, the control system again determines that an error relating to the waste toner box 60 has occurred.

In this way, one sensor can be used to detect both that the waste toner box 60 is not installed and that the waste toner box 60 is filled with waste toner. Although this sensor is arranged so as to monitor the presence or absence of the waster toner box and the amount of waste toner from the balance in weight between the rod 62 and the waste toner box 60, it is possible to employ a spring or the like to hold the balance as well as the dead load of the rod 62.

The tractor unit 20 is arranged so that, as shown in FIG. 2, the two endless belts 21, 21 stretched between a driving shaft 22 and a driven shaft 23 are driven by the main motor 40 via a field clutch (not shown, hereinafter called the F clutch) and a gear train (not shown) provided in a gear box 41.

The gear train extending from the main motor 40 to the drive shaft 23 in the tractor unit 20 is arranged so that the continuous recording sheet FP would be fed at the velocity of 50 mm/sec. if the tractor unit 20 would independently feed the recording sheet FP. Moreover, the gear train contains a unidirectional clutch which races with a predetermined resistance in compliance with sheet tension when the paper is drawn at a rate higher than 50 mm/sec. to prevent the paper from overdriving the motor 40.

Figure 6:
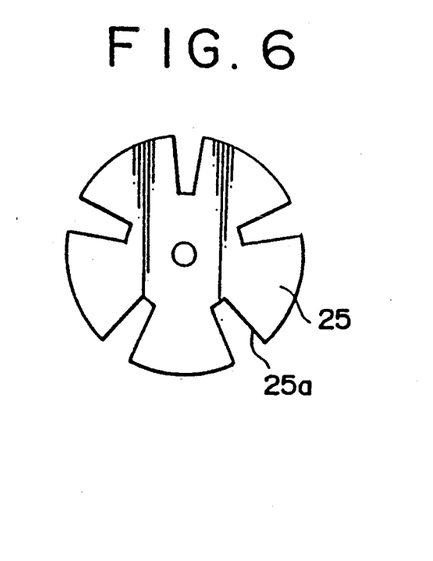
FIG. 6 shows a disc for use in generating PFS pulses.

The driven shaft 22 is connected with a disc 25 via a chain 24. The disc 25 is rotatable in response to the rotation of the driven shaft 22. As shown in FIG. 6, the disc 25 is provided with slits 25a which are spaced from each other by a predetermined distance. The disc 25 is positioned between the light emitting member and the light receiving member of the photo-interrupter 26, and a pulse corresponding to the amount of movement of the recording sheet FP is obtainable. The photo-interrupter 26 is hereinafter called the PFS (Paper Feed Sensor), with its output as a PFS pulse.

The PFS pulse is generated such that, when the recording sheet is fed by $\frac{1}{4}$ inch, one pulse is outputted. Further, the signal corresponding to the slit portion 25a and the signal corresponding to the portion other than the slit 25a correspond to the perforated lines of the continuous recording sheet FP and the non-perforated portion, respectively.

However, the positional relation between the disc 25, for generating the PFS pulse, and a base plate on which the photo-interrupter 26 is mounted, may not be the same in individual printers because of assembly errors.

If the slits 25a formed in the disk 25 are rectangular in the radial direction, the pulse width thus outputted may vary, depending on where the photo-interrupter 26 has detected the slits 26a in the radial direction of the disc 26, and depending on shift in the relative position between the disc 25 and the photo-interrupter 26.

As this printer is arranged so that the paper feed error is judged by detection of the PFS pulse, the variation of the pulse width may result in misjudgment of an error.

For this reason, the slit 25a formed in the disc 25 is fan-shaped so that its width gradually increases toward the circumference. In other words, the slit 25a is defined by a pair of radii of the disc 25. With this fan shape, the width of the pulse thus outputted can be unified (i.e., the ratio between slit 25a and the non-slit portion remains constant) irrespective of the position where the photo-interrupter has detected the slit in the radial direction of the disc 25, thus preventing the misjudgement of an error. In addition, the assembly precision required is eased and hence assembly workability is improved.

Sensors for detecting paper errors will subsequently be described.

In a conventional laser printer using cut sheets, two sensors are provided along a sheet feed path to detect the jamming of recording sheet. Paper errors are detected when the sheet does not pass the down-stream side sensor a predetermined time after it passes the upstream side sensor. Since there are no breaks in the continuous recording sheet, the aforementioned method of detection cannot be utilized in a printer using a continuous recording sheet.

In the printer 100, there are provided four kinds of sensors for detecting the presence or absence of the paper along the sheet feed path. The sheet empty and paper jamming conditions are detected by detecting the changing of a sheet feed speed and the lifting up of the sheet.

The first sensor is an empty sensor 50 provided between the feed port 1 and the transfer unit 10. This printer 100 does not print on the portion of the page adjacent to the perforated lines which are used as a break between pages. The perforated lines are located right under the photoconductive drum 11 of the transfer unit 10 and at the position of the fixing rollers 31, 32 when printing is stopped in this printer 100. The sheet empty condition can be detected from the output of the empty sensor 50 when the last page of the recording sheet FP is located in the printer. Moreover, it is detectable, by counting the PFS pulses, what portions of the recording sheet are positioned at the transfer unit 10, at the fixing unit 30, and further at the empty sensor. Consequently, the counting of the PFS pulse and the output of the empty sensor 50 can be used to detect the recording sheet FP being torn off at a non-perforated portions.

The second sensor comprises skew sensors 51, 51 provided between the fixing unit 30 and the tractor unit 20. The skew sensors 51, 51 are used for detecting skewing and cutting-off of the continuous recording sheet FP. The sensors 51, 51 are capable of detecting the sheet when at least one side thereof lifts up.

The third sensor is a top sensor 52 provided in the central part of the web between the skew sensors 51, 51. The top sensor 52 is used for detecting the leading end of the paper when the printing is started. After the predetermined numbers of the pulses have been counted after the leading end of the recording sheet FP passed the top sensor 52, the leading end thereof reaches the fixing unit 30, whereas the following perforations are positioned at the transfer unit 10.

The fourth sensor is a jam sensor 53 provided in the upper cover UC substantially opposite to the top sensor 52 with the sheet feed path therebetween. The jam sensor 53 is used for detecting the sheet when the sheet is jammed in the fixing unit 30 and the central part of the recording sheet swells out to contact the jam sensor 53.

The fixing unit 30 comprises a heat roller 31 provided in the upper portion of FIG. 1, and a press roller 32. The continuous recording sheet FP is nipped between the rollers 31, 32, and is pressed against the heat roller 31 by the press roller 32 with a predetermined pressure. In the heat roller 31, a heating halogen lamp, and a thermistor for temperature detection are provided.

The heat roller 31 is driven by the main motor 40 to rotate via the F clutch and the gear train and arranged so that, when the continuous recording sheet FP is held between the rollers 31, 32, it is fed at the speed of 75 mm/sec. As a result, the continuous recording sheet FP is actually driven by the fixing unit 30, whereas the tractor unit 20 functions mainly to prevent skewing of the continuous recording sheet FP.

If the continuous recording sheet FP is pressed against the heat roller 31 while printing is a standby state, the paper may be scorched by the heat of the heat roller 31. In order to avoid scorching of the sheet, in this printer 100, the press roller 32 facing the heat roller 31 is made vertically movable so that the continuous sheet is retracted from the heat roller 31 while printing is in standby state.

Further, the rocking (movement) of the press roller 32 and that of the transfer charger 15 are implemented by the same drive means.

Figure 7:
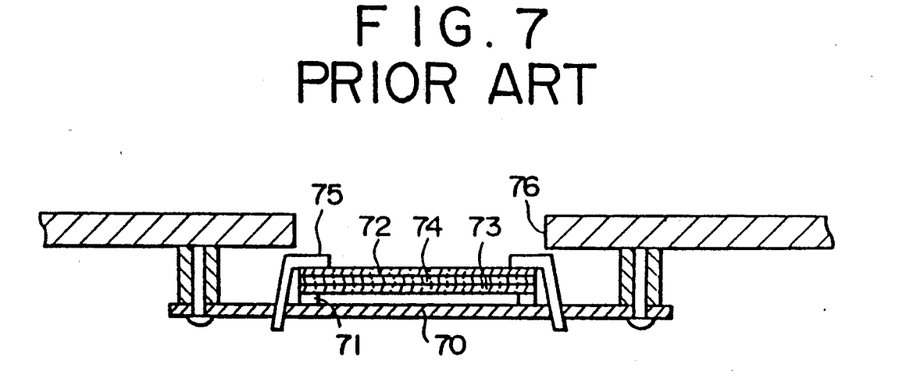
FIG. 7 illustrates a construction of a conventional liquid crystal display panel.

A general liquid crystal display panel heretofore in use is, as shown in FIG. 7, built by mounting two glass plates 72, 73 on a substrate 70 via conductive rubber member 71 and nipping a layer of liquid crystal 74 between the glass plates 72, 73. Moreover, the edges of the glass plates are enclosed with a frame 75, which is secured to the substrate 70. The substrate 70 is secured with screws to the body so that the display panel can be viewed through an opening 76.

The arrangement stated above, however, has posed a problem since the increased number of parts makes it troublesome to assembly the display unit.

Figure 8:
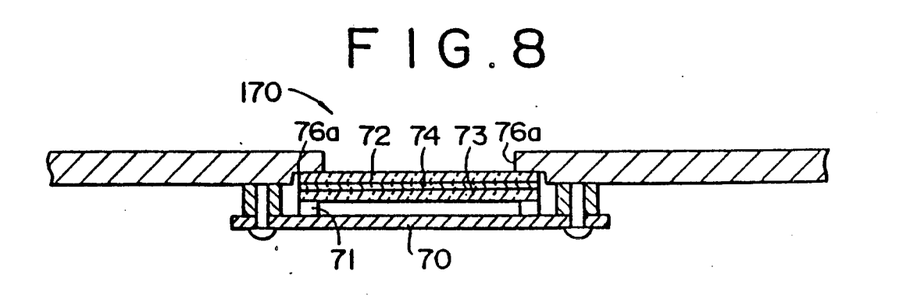
FIG. 8 shows a construction of a liquid crystal display panel of the printer of FIG. 1.

The liquid crystal display unit 170 of this embodiment, provides a stepped portion in the peripheral edge of the opening 76 of the body as shown in FIG. 8. The glass plates 72, 73, between which the liquid crystal layer 74 is inserted are directly mated with the stepped portion 76a, and the combination is secured with screws onto the body. With this arrangement, the frame can be omitted, so that the number of parts becomes reducible.

Figure 9:
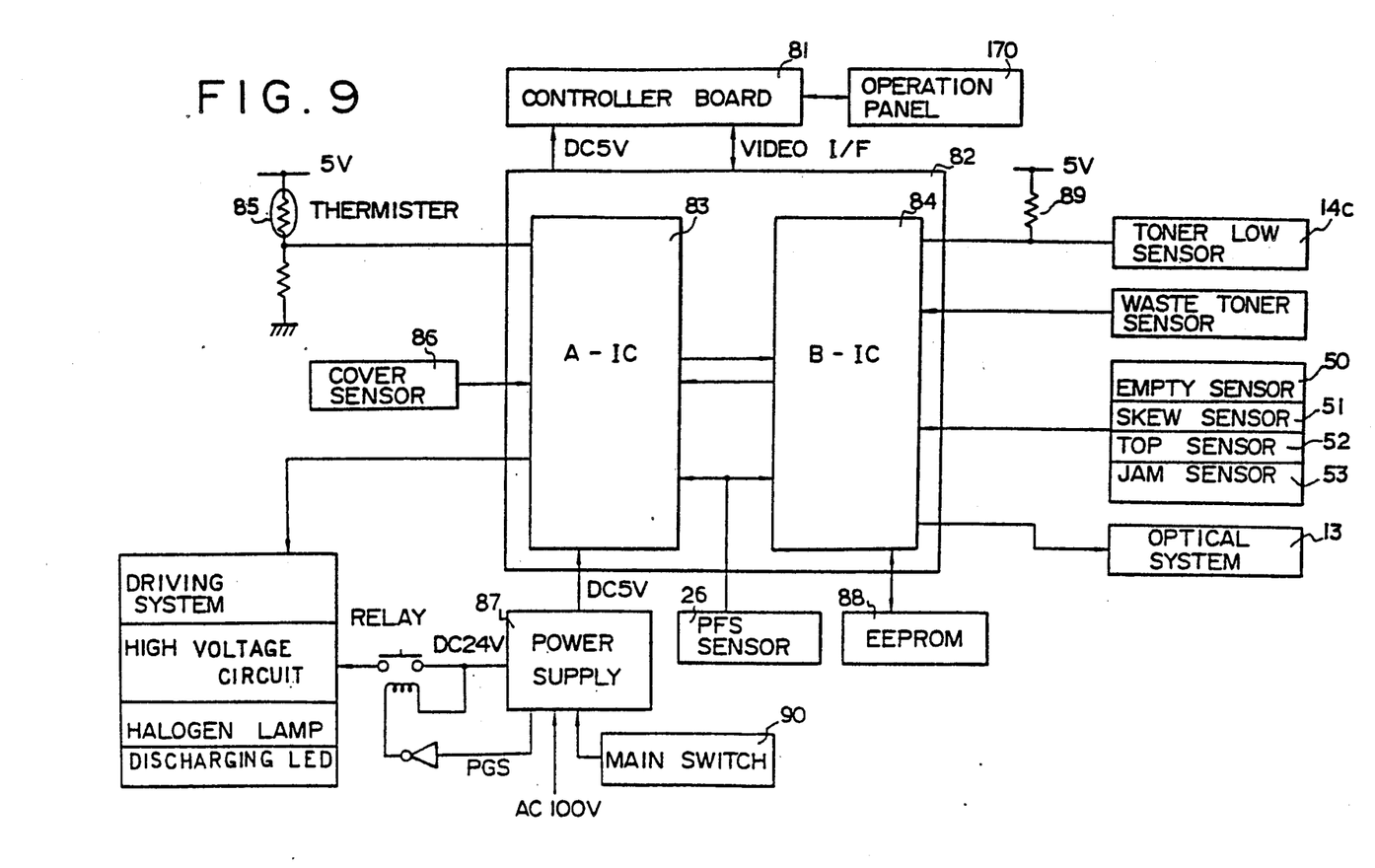
FIG. 9 is a block diagram illustrating a control system in the printer of FIG. 1.

FIG. 9 shows a control circuit of the printer.

This circuit comprises a controller 81 for developing the printing data received from a host computer into a map on a dot basis and outputting the map, and a driver 82 comprising two CPU's: one of which is an A-IC 83 mainly for controlling printing; and the other is a B-IC 84 mainly for performing error detection. The controller 81 is provided with a buffer which is capable of developing printing data corresponding to six pages of the recording sheet. New data is successively written to the buffer from time to time as the data is transferred to the driver.

The controller 81 and the driver 82 are connected via a video interface (video I/F) for transferring printing data, and a command line for transmitting various data.

The A-IC 83 is connected with a high voltage circuit to which biases for the charger 12 and the like in the transfer unit 10 are connected. Further, a drive system including the main motor 40, the F clutch 41, and the halogen lamp in the heat roller 31 are connected to the A-IC to be controlled thereby.

A thermistor 85 for detecting the temperature of the heat roller 31, a cover sensor 86 for detecting the opening and closing of the upper cover UC, and the PFS sensor (or photo-interrupter) 26 are connected to the A-IC and comprises the sensors for supplying data to the A-IC.

The heat roller 31 is controlled as to have a high temperature as the fixing temperature only during printing, and low temperature as a standby temperature when the printer is in standby state to save power and to prevent the printer temperature from rising.

Power is supplied to the halogen lamp provided in the heat roller 31 as a heat source from the power supply 87 for supplying 100 volts a.c. The power supply is turned ON/OFF by a signal from the A-IC 83. The A-IC 83 receives an analog output from the thermistor provided adjacent to the heat roller 31 and performs A/D conversion so as to perform temperature control.

Figure 10:
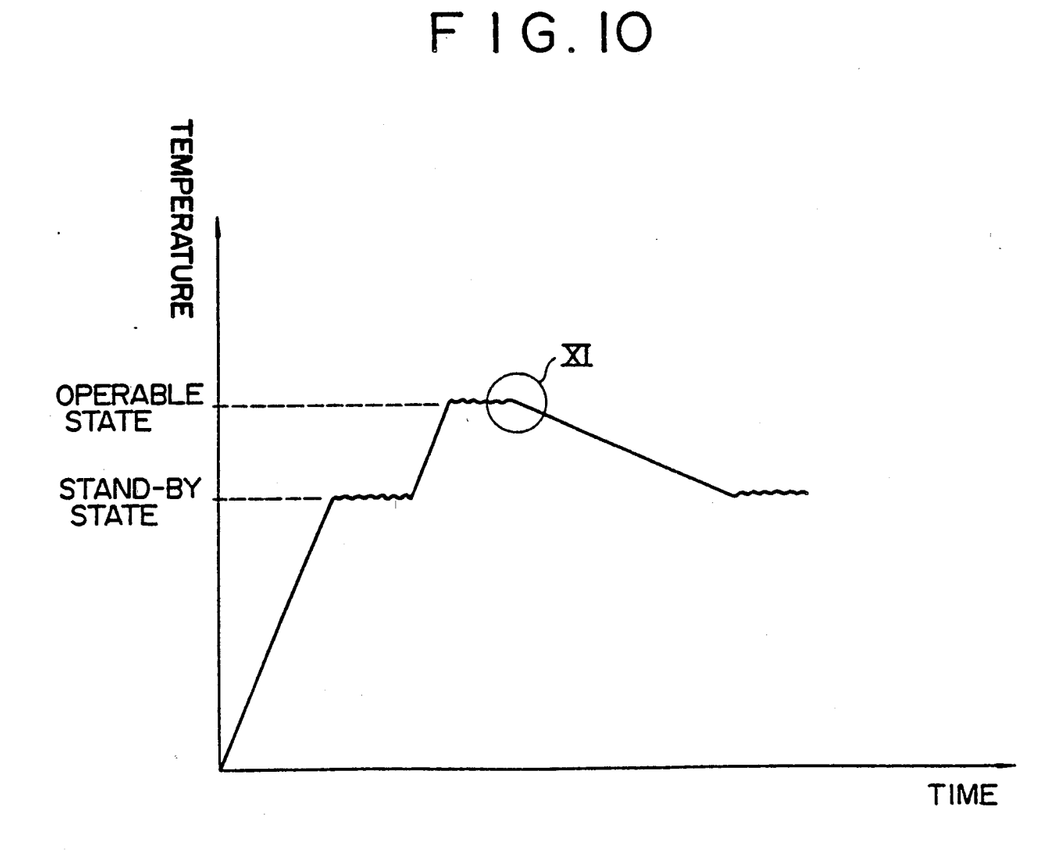
FIGS. 10 and 11 are graphs illustrating temperature control of the heat roller for the printer of FIG. 1.

The temperature control operates with an allowance of approximately ±5 degrees. As a result, the actual temperature of the heat roller 31 fluctuates within upper and lower limits as shown in FIG. 10. Accordingly, there is a difference in time required to lower the temperature to a certain value, depending upon the actual temperature of the heat roller 31. If the actual temperature of the heat roller 31 is at the upper limit of the fixing temperature, the time required to lower the temperature to the certain temperature is relatively long, while, if the actual temperature is at the lower limit of the fixing temperature, the time is relatively short. In other words, the temperature of the heat roller 31, after a predetermined time has past, differs, depending upon the temperature of the heat roller 31 when the temperature began to be lowered. It is obvious that more warm-up time will be required to raise the temperature of the heat roller 31 to the operable (fixing) temperature from the lower temperature than from the higher temperature.

Figure 11:
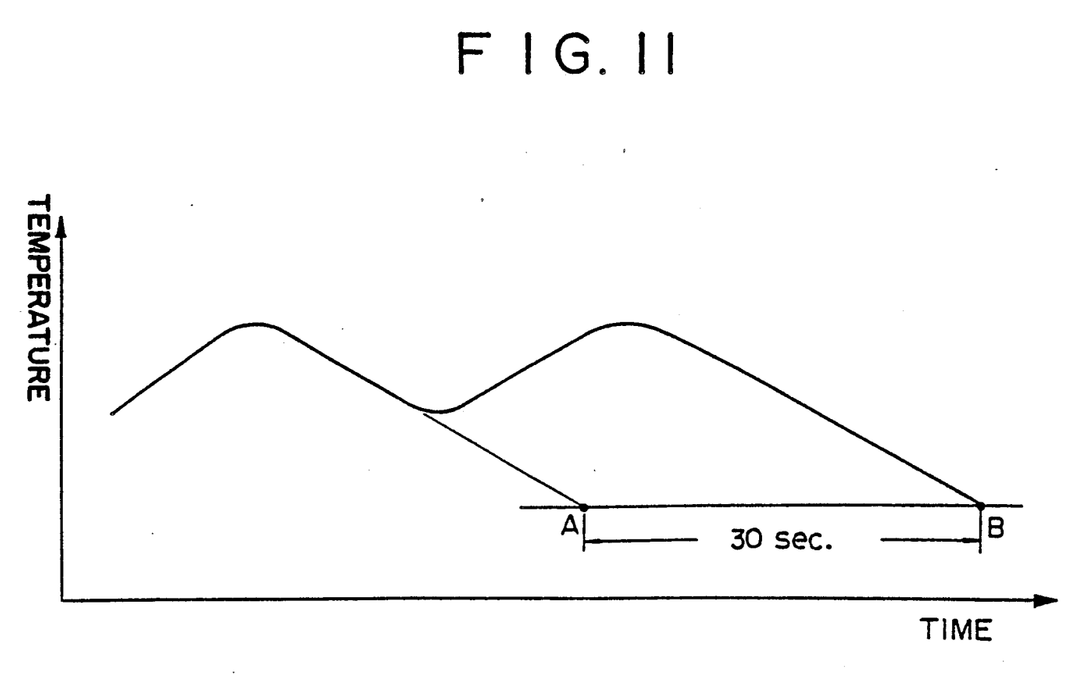

FIG. 11 shows the difference between two cases when the temperature of the heat roller 31 is lowered to a predetermined temperature set between the fixing and the standby temperatures. Point A shows a point where the temperature is lowered to a predetermined temperature, when it is lowered from the lower limit of the fixing temperature, and point B shows a point where the temperature is lowered to a predetermined temperature when it is first raised to the upper limit, then lowered from the upper limit. In this example, there are approximately 30 seconds between points A and B.

In the printer of this embodiment, when the temperature is lowered from the fixing temperature to the standby temperature, the temperature is first raised to the upper limit of the fixing temperature being before lowered. In this way, the temperature is prevented from being lowered from the relatively low temperature within the fixing temperature range, so that the warm-up time required to raise the temperature up to the fixing temperature again can be shortened.

The B-IC 84 is connected to a semiconductor laser of the laser scanning unit 13 and an EEPROM 88 for storing printer life data.

As to means for inputting data to B-IC 84, the empty sensor 50, the skew sensor 51, the top sensor 52 and the jam sensor 53 are connected to the B-IC 84 and are concerned with the paper feeding. In addition, B-IC 84 is connected with the waste toner sensor for warning of the presence or absence of the waste toner box 60 and the amount of accumulated waste toner, and the toner low sensor 14C for warning of the shortage of toner, which are provided in the transfer unit 10 and are concerned with toner.

As to the toner low sensor, in a conventional laser printer, it is common practice to set the sensor to output a low level signal when no toner is detected. With this arrangement, however, the problem is that when the sensor is disconnected, the low level signal indicating the toner low condition cannot be detected. In other word, the disconnection of the sensor and the toner-sufficient condition cannot be distinguished in the conventional printer.

In this embodiment, the toner low sensor 14c outputs a high level signal when toner low is detected, while the B-IC 84 receives the signal in a pull-up state through the use of a pull-up resistance 89 for receiving the signal in the pull-up state.

HIGH is thereby inputted to the B-IC 84 when toner low is detected by the sensor 14c, when disconnection occurs in the sensor system and when the developing unit 14 installed with the toner low sensor 14c not attached to the printer 100. In other words, a number of symptoms can simultaneously be detected with one sensor 14c.

The toner low sensor 14c comprises the piezoelectric element incorporated in the bottom surface of the toner case 14a and outputs a LOW level signal on sensing the pressure applied by the toner accommodated in the toner case 14a; and a HIGH level signal without such pressure.

When sufficient toner is stored in the toner case 14a, the toner is always placed on the piezoelectric element, acting as the toner low sensor 14c, despite the operation of the scraper 19, and the LOW level signal is always outputted. On the other hand, when the amount of toner is low, the HIGH level signal is outputted irrespective of the operation of the scraper 19.

If the toner case 14a is substantially half filled with the toner, the toner is alternately placed on and swept off of the toner low sensor 14c as the scraper 19 slowly rotates, thus causing alternative output of the LOW and HIGH signals. Monitoring the duty ratio of the output of the toner low sensor 14c, the B-IC 84 judges the amount of the toner to be low when the HIGH signal exceeds 80 percent.

As the toner is not supplied on the developing roller 14b by the scraper 19 immediately after power is supplied, the output of the toner low sensor during the first three seconds, for two rotations of the scraper, is ignored. After the elapse of the three seconds, the toner low sensor 14c starts monitoring. Misjudgment of the toner low condition can thereby be prevented before the operation of the scraper 19, when power is first supplied.

The A-IC 83 and the B-IC 84 control the printer 100 by exchanging data via a plurality of signal lines. From the B-IC 84 to the A-IC 83, signals, such as a signal indicating that the B-IC 84 is in a standby state, a STOP signal for immediately stopping the operation of each unit of the printer 100 when an emergency error occurs, even if the printing is being executed, and a PAUSE signal for stopping the operation of each unit after the predetermined operations, when a less urgent error occurs are transmitted.

On the other hand, error signals indicating errors in the drive system are transmitted from the A-IC 83 to the B-IC 84.

The B-IC 84 analyzes the error detected by itself and the errors transmitted from the A-IC 83 thereto, then determines their degrees of emergency or urgency in accordance with predetermined standards. The B-IC 84 selects the STOP or PAUSE signal depending on the degree of emergency, and then transmits the signal to the A-IC 83. The less urgent errors are the errors of a toner overflow, a toner low and a paper empty, while the other errors are treated as emergency errors.

Figure 12:
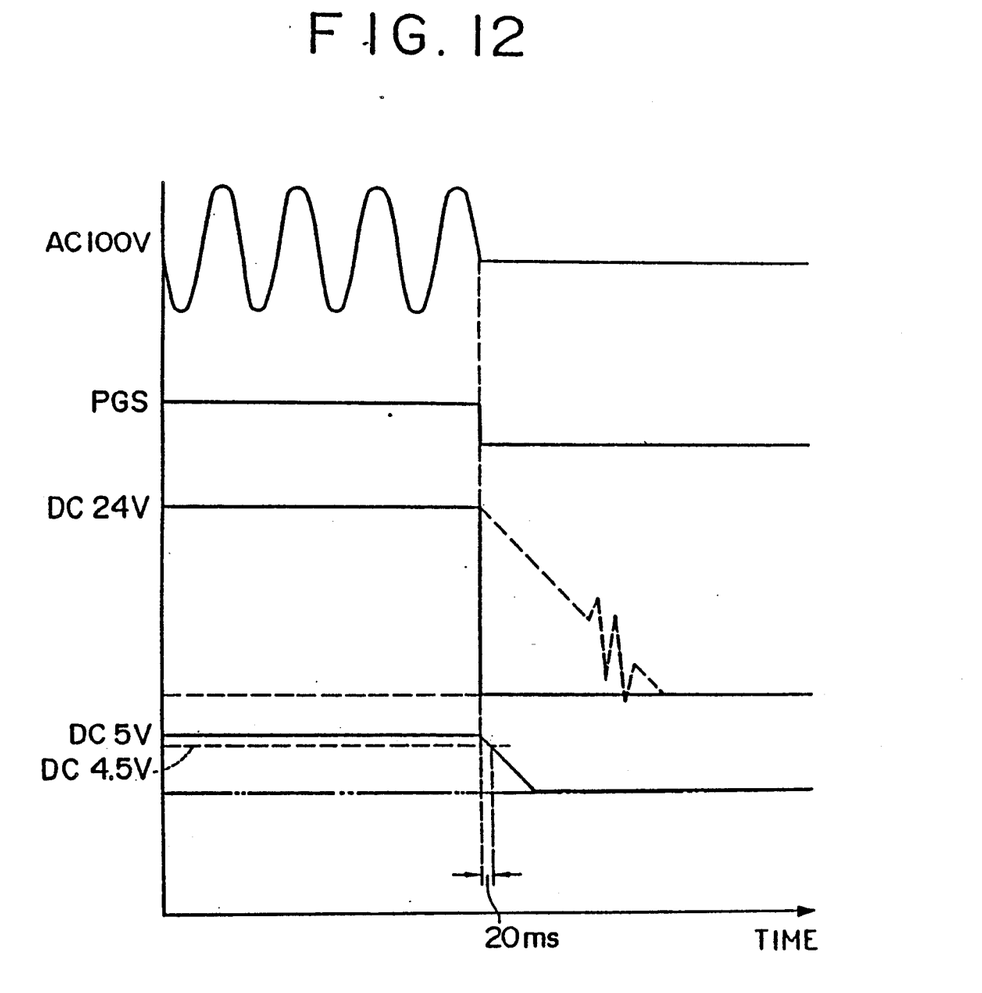
FIG. 12 is a graph illustrating power supply control of the printer of FIG. 1.

One hundred volts a.c. is applied to the printer, the control system being driven at 5 volts d.c., and the driving system, such as a motor, being driven at 24 volts d.c. When a main switch 90 of the printer 100 is turned off, the voltage gradually drops from 24 volts d.c. ultimately to 0 volt, as shown by a broken line in FIG. 12.

The 5 volts d.c. power supply for the control system is so designed that more than 90 percent of the rated voltage (i.e. 4.5 volts d.c.) is held at least 20 msec. for storing data after the main power supply is turned off. Because, if the voltage becomes less than 90 percent of the rated voltage, the control system may fail to control driving system.

As to the 24 volts d.c. power supply for the driving system, the voltage tends to fluctuate while it drops because of the operation of a protection circuit on the power supply side. Further, the control system does not operate, since 5 volts d.c. is cut off at that point of time, which may cause vibration of the motor and hence malfunctions.

In this printer 100, the voltage applied to the driving system is instantaneously dropped from 24 volts d.c. to 0 volt upon turning off the 100 volts a.c. main power supply 87 in order to prevent the aforementioned malfunctions. A relay is provided between the power supply and the driving system as a switch for the function stated above. The relay operates to cut off 24 volts d.c. either when a power good signal (PGS) representing the ON/OFF status of the main power 87 supply is cut off, or when the upper cover is opened.

By instantaneously dropping the voltage from 24 volts d.c. to 0 volt as above, the driving system is stopped while the control system functions with 5 volts d.c. being applied. Moreover, the fluctuation of the voltage while it is dropping is prevented. Consequently, the motor is prevented from vibrating and hence malfunctioning.

Laser printers are generally provided with a data recovery function for reprinting a blank page due to jamming or the like.

The printer 100 of this embodiment is designed to determine the number of pages to be reprinted (page data) in the driver according to the respective errors: the paper jamming error, the paper empty error detected in a portion other than perforations or when the upper cover UC is opened during printing. Based on the number of pages, the controller 81 requests the host computer to transmit printing data to be reprinted.

The driver detects the page being printed at present according to the PFS pulse.

There are four kinds of page recovery data to be transmitted; namely, data "0" requiring no recovery, "1" requiring only one whole page which is being transferred to be reprinted, "2" requiring the page being transferred and the page precedingly transferred to be reprinted, and "3" requiring the page being transferred and preceding two pages to be reprinted.

When trouble occurs on the first page, the page data "1" is transmitted and the controller 81 requests the host computer for data on the page being printed and transmits the data to the driver again after developing it on the buffer.

When trouble occurs on the second page, the third page or thereafter, the respective data is set at "2" or "3" and the controller 81 requests the host computer for data on the page to be reprinted.

When the opening of the upper cover UC is detected during printing of the third page, the page data is set at "1".

It may otherwise be arranged that the page data on reprinting is not determined by the page that has experienced a problem, as stated above, but by the number of pages to be traced back, depending on the place where jamming has occurred.

Although reference has been made to the use of continuous sheet whose page length is 11 inches long in the embodiment shown, continuous sheet whose page length is 12 inches long may also be used by changing a counter for counting PFS pulses therefor.

If 12-inch page length sheet is used in this printer 100, some additional arrangements may also be considered such that the last page carrying an unfixed toner image is discharged when the printing is terminated, that the page remaining in the printer 100 is fed when printing is restarted, or that the perforated line is located at the fixing unit with the portion one inch from the next perforation being located at the transfer unit 14.

Figure 13:
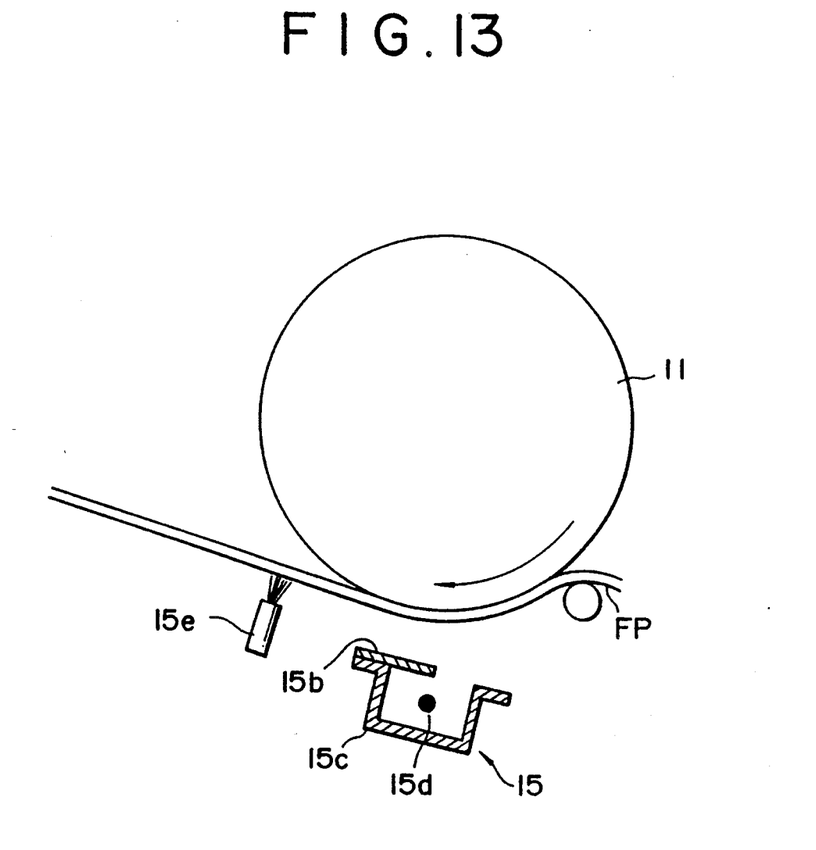
FIG. 13 is an enlarged view of a transfer charger.

As shown in FIG. 1 and FIG. 13, the transfer charger 15 is provided with a casing 15c, which is U-shaped in section, having an opening extending in the direction parallel to the rotary axis of the photoconductive drum 11. The opening of the casing 15c is covered with an insulating member such as a Mylar film 15b, and a wire 15d is centered in the casing 15c and extends along the casing 15c to cause the corona to charge the recording sheet FP when energized. Moreover, a discharging brush 15e is installed at the downstream-side of the transfer charger 15 in the direction in which the recording sheet FP is fed.

The Mylar film 15b is arranged so that it covers the down-stream side half of opening of the casing 15c in the sheet feed direction, and the discharge area of the transfer charger 15 is shifted to this side from the center of the contact area wherein the photoconductive drum 11 and the recording sheet FP contact each other in the sheet feed direction.

The same effect is achievable by shifting the transfer charger 15 itself to be positioned on the upstream side in the sheet feed direction.

The function of the transfer charger 15 will subsequently be described with reference to experimental data.

The table on the following page shows the results derived from the measurement of image densities under a plurality of transfer voltages in consideration of the relation between humidity and an opening location of the charger.

As is shown in the table, the image density is improved by setting the opening position forward when the humidity is low. However, a difference in the opening positions least affects transfer efficiency when the humidity is medium or high. Therefore, it is advantageous to determine the opening position with a view to the performance when the humidity is low.

TABLE

| H | O | \multicolumn{7}{c|}{Transfer Voltage (kV)} |
|---|---|---|---|---|---|---|---|---|
|   |   | 3.4 | 3.6 | 3.8 | 4.0 | 4.2 | 4.4 | 4.6 |
| Low | Front | 0.5 | 0.9 | 1.0 | 1.2 | 1.3 | 1.3 | 1.3 |
| Low | Center | 0.4 | 0.7 | 0.8 | 1.0 | 1.2 | 1.25 | 1.3 |
| Low | Rear | 0.3 | 0.4 | 0.6 | 0.8 | 1.1 | 1.25 | 1.3 |
| Medium | Front | 0.8 | 1.2 | 1.1 | 1.1 | 1.1 | 1.1 | 1.1 |
| Medium | Center | 0.9 | 1.2 | 1.1 | 1.1 | 1.1 | 1.15 | 1.1 |
| Medium | Rear | 0.6 | 1.2 | 1.2 | 1.2 | 1.15 | 1.2 | 1.1 |
| High | Front | 1.0 | 1.2 | 1.2 | 1.0 | 1.0 | 1.0 | 1.1 |
| High | Center | 1.0 | 1.2 | 1.2 | 1.0 | 1.0 | 1.0 | 1.1 |
| High | Rear | 1.0 | 1.2 | 1.2 | 1.0 | 1.0 | 1.0 | 1.1 | where,

H: humidity, and

O: opening position with respect to the feeding path.

When the opening position set forward, and the humidity is low, the transfer efficiency is improved. The reason for this seems attributable to the fact that the transfer is effected at a position where the contact pressure applied to the recording sheet FP and the photoconductive drum 11 is high and that the sheet charging amount at the normal transfer position is large since the recording sheet FP is charged before it reaches the transferring area.

The image density and the fixing efficiency of the fixing device were also measured during the experiments. The use of dry sheet was seen to result in disturbing the toner image on the recording sheet, and yet unfixed, as the surface of the heat roller was charged. Consequently, the disturbance of the image can be prevented by making the heat roller of conductive material in order to prevent charging of the heat roller.

As to the discharge brush 15e, the effect of preventing the disturbance of the toner image on the paper before fixing is greater, particularly when the humidity is low than what is achieved by releasing the brush 15e from touching the paper.

Although a description has been given of a case where the present invention is applied to a laser printer, the range of its application is not limited to that case, but covers many cases where it is applied to apparatus employing electrophotography, such as copying machines.

As set forth above, excellent image density is obtainable at low transfer voltage, even when humidity is low, by shifting the charging position towards the upstream side of the drum according to the present invention. A difference in transfer efficiency due to humidity variation can thus be minimized.

The present disclosure relates to subject matters contained in Japanese patent applications No. HEI 1-293712 (filed on Nov. 10, 1989) and No. HEI 2-98226 (filed on Apr. 11, 1990) which are expressly incorporated herein by reference in their entireties.

What is claimed is:

1. A transfer device for use in an electrophotographic printer for transferring a toner image onto a recording medium, comprising:

means for carrying the toner image to be transferred onto said recording medium;

a transfer charger, for charging said recording medium so that the toner image carried by said image carrying means is transferred to said recording medium, the lateral center of a discharging area of said transfer charger being arranged to face the recording medium at the upstream-side portion, with respect to the feeding direction of said recording medium, of an area where said imaging carrying means and said recording medium contacts, whereby said recording medium is charged at the upstream-side of the portion with respect to the lateral center of the portion where said recording medium and said image carrying means contacts;

said image carrying means comprising a photoconductive member having a rotary axis, the charged surface of said photoconductive member being exposed to light carrying image data so that a latent image is formed thereon, toner being adhered to the latent image formed on said photoconductive member; and said transfer charger comprising a charger wire for charging said recording medium, and a casing for accommodating said charger wire, said casing and said charger wire extending in a direction parallel to the rotary axis of said photoconductive member, an opening formed in the lateral direction on said casing such that said charger wire faces said photoconductive member, and wherein a layer of insulating material is provided at the downstream-side of said opening in the feeding direction of said recording medium, such that the downstream-side half of said opening is substantially covered by said layer of insulating material.

2. An electrophotographic printer comprising:

a recording medium;

a photoconductive member, having a rotary axis and adapted to be charged and then exposed to light carrying image data and having a latent image formed thereon, toner being adhered onto said photoconductive drum;

a transfer charger for charging said recording medium so that the toner image carried by said photoconductive member is transferred to said recording medium, the lateral center of a discharging area of said transfer charger being arranged to face the recording medium at the upstream-side portion, with respect to the feeding direction of said recording medium, of an area where said photoconductive member and said recording medium contacts, whereby said recording medium is charged at the upstream-side portion, with respect to the lateral center portion where said recording medium and said photoconductive member contacts; and said transfer charger comprises a charger wire for charging said recording medium, and a casing for accommodating said charger wire, said casing and said charger wire extending in the direction parallel to the rotary axis of said photoconductive member, an opening being formed in the lateral direction on said casing such that said charger wire faces said photoconductive member, and wherein a layer of insulating material is provided at the downstream side of said opening, in the feeding direction of said recording medium, such that the downstream-side half of said opening is substantially covered by said layer of insulating material.

3. A transfer device employed in an electrophotographic printer for transferring a toner image onto a recording medium, comprising:

means for carrying the toner image to be transferred onto said recording medium, said image carrying means having a rotary axis;

a transfer charger for charging said recording medium so that the toner image carried by said image carrying means is transferred to said recording medium, said transfer charger comprising a casing for accommodating a charger wire, said casing extending in a direction parallel to the rotary axis of said image carrying means, said casing comprising an opening formed in a side of said casing that faces said image carrying means, said opening extending parallel to the rotary axis of said image carrying means such that a charger wire accommodated in said casing faces said image carrying means, and a layer of insulating material, provided at the downstream-side of said opening in the feeding direction of said a recording medium, such that a downstream-side portion of said opening is covered by said layer of insulating material.

4. The transfer device according to claim 3, wherein said insulating material covers substantially half of said opening in said casing.

5. The transfer device according to claim 3, said image carrying means comprising a photoconductive member.

* * * * *

UNITED STATES PATENT AND TRADEMARK OFFICE
CERTIFICATE OF CORRECTION

PATENT NO. : 5,101,239
DATED : March 31, 1992
INVENTOR(S) : T. Nishikawa, et. al.

It is certified that error appears in the above-indentified patent and that said Letters Patent is hereby corrected as shown below:

On the Title page, item [75], Inventor, change "Tsutomi" to Tsutomu--.

Signed and Sealed this

Seventeenth Day of August, 1993

*Attest:*

BRUCE LEHMAN

*Attesting Officer*  *Commissioner of Patents and Trademarks*